INVENTOR.
Thomas G. Cook
BY Earl D. Ayers
AGENT 3,240,337
BROMINATOR
Thomas G. Cook, Bay City, Mich., assignor to The Dow Chemical Company, Midland, Mich., a corporation of Delaware
Filed Feb. 4, 1963, Ser. No. 255,798
7 Claims. (Cl. 210—94)

This invention relates to brominators and particularly to brominators which are adapted to deliver a bromine-water or bromine-bromide-water solution over a wide range of flow conditions and over a wide range of concentration of bromine in the solution.

It has been found desirable to prepare concentrated bromine-water or bromine-bromide-water solutions for use as a feed to a chemical process or a source of supply of bromine for water purification purposes, for example.

Prior art brominating devices which are known to be commercially available are not satisfactory where the feed rate demand varies over considerable ranges. Further, in most instances, at least, the brominator output is a dilute solution and thus requires the handling of large volumes of solution to feed a small amount of bromine.

In addition, the mechanics of handling many of the prior art brominators make them awkward for use in some applications. Safety hazards must also be considered in using such devices.

Accordingly, a principal object of this invention is to provide an improved bromination apparatus.

Another object of this invention is to provide an improved bromination apparatus which delivers a concentrated bromine solution.

A further object of this invention is to provide an improved bromination apparatus which has the capability of operating over a wide range of delivery rates.

Yet another object of this invention is to provide an improved bromination apparatus which is convenient to operate.

In accordance with this invention, there is provided an elongated enclosed vessel having a sintered glass plate disposed across the vessel near one end thereof. The sintered plate divides the vessel into two chambers, usually a larger upper chamber and a smaller lower chamber.

The upper chamber has an outlet near its upper end which is covered by a sintered glass plate. Means are also provided for charging the upper chamber with bromine.

Inlet means for pumping water or bromide solution through the brominator are coupled to the lower chamber.

The water or bromide solution to be brominated is pumped into the lower chamber, through the porous sintered plate and the bromine in the upper chamber, then through the outlet in the upper chamber and into a utilization means, for example.

Figure 1:
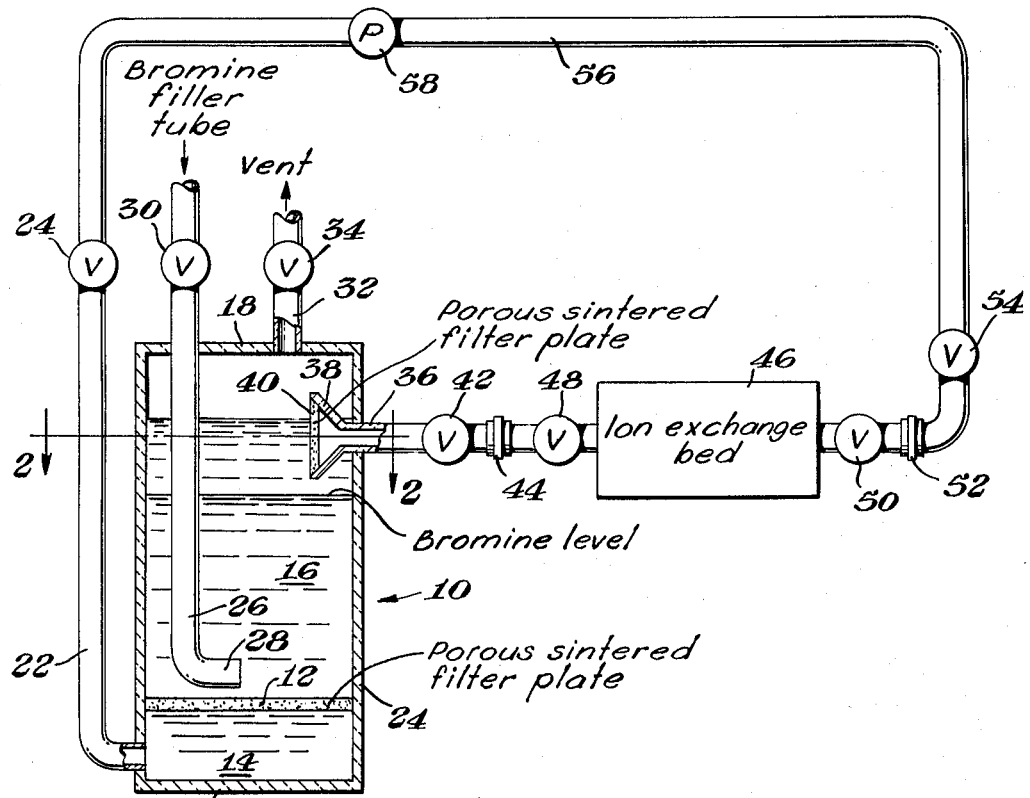
Figure 2:
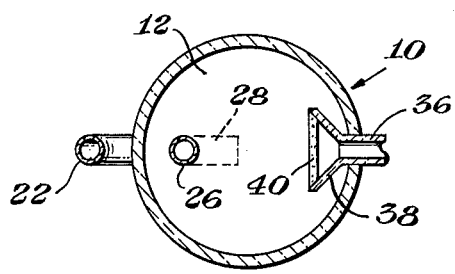

The invention, as well as additional objects and advantages thereof, will best be understood when the following detailed description is read in connection with the accompanying drawing, in which:

FIG. 1 is a side elevational view, partly in section, of brominating apparatus in accordance with this invention, and FIG. 2 is a sectional view taken along the line 2—2 of FIG. 1.

Referring to the drawing, there is shown a cylindrical vessel, indicated generally by the numeral 10, which has a sintered glass porous plate 12 disposed across and welded around its edge surface to the walls of the vessel, dividing it into two chambers 14, 16. The lower chamber 14 is usually considerably smaller than the upper chamber 16 which is to be partly filled with bromine. As shown, the plate 12 is disposed parallel with the top 18 and bottom 20 of the vessel, although such disposition is not essential to the invention.

A solution inlet tube 22 extends through the side wall 24 of the vessel. The tube 22 has a valve 24 along its length.

A bromine fill tube 26, having an "L"-shaped section 28 at its lower end, extends through the top 18 of the vessel 10 and has its lower end section 28 disposed near to the sintered plate 12. The bromine fill tube 26 has a valve 30 along the part of its length which is outside of the vessel. A vent tube 32, having a valve 34, also extends through the top 18 of the vessel.

A brominated solution discharge line 36 extends through the side wall near the top end 18 of the vessel. The part of the line 36 which lies inside the vessel has a funnel shaped inlet 38 which has a porous sintered plate 40 sealed across its widest opening part. The discharge line 36 has a valve 42 disposed between the vessel and the coupling element 44 at its end.

An enclosed ion exchange bed 46, having a valve (48, 50) at each end, is coupled to the discharge line 36 by means of the coupling 44. The valve 50 is coupled through the coupling 52 and valve 54 to the line 56. The line 56 has a pump 58 along its length and is coupled to the inlet tube 22, as at the valve 24.

To initially put the apparatus in operation, the lower chamber 14 is completely filled with water (or bromide solution) and the upper chamber is charged with water sufficient to cover the lower end 28 of the bromine fill tube 26. Then, with the valves 30 and 34 open and the valves 24, 42 closed, bromine is fed into the upper chamber to the desired level, said desired level being below the level of the porous plate 40 and the discharge line 36.

The valve 30 is then closed. With the valves 24 and 34 (the vent valve) open, water or bromide solution, from a source other than the line 58, is fed, usually under pressure, through the valve 24 and inlet tube 22 and is forced through the porous sintered plate 12 and into the upper chamber 16 until it at least reaches the level of the discharge tube 36. The vent valve 34 is then closed.

With the valves 24, 42, 48, 50, 54 open, water or bromide solution is then pumped, by means of the pump 58, through the brominator and ion exchanged bed in more or less continuous circulation until the ion exchange bed is "charged" to the desired degree.

As the water or bromide solution (usually sodium bromide) enters the lower chamber 14 under pressure, water or bromide solution is forced upwardly through the porous sintered glass plate 12, thus being broken up into very fine streams. These very fine streams of solution pass upwardly through the more dense bromine which lies on top of the plate 12 in the chamber 16, thus forming a more or less saturated bromine solution as they contact the bromine.

The bromine solution in the upper chamber 16 is then dispelled from the brominator and passes into the ion exchange bed where the bromine is removed from solution and combined with the quaternary ammonium anion exchange resin of the column 46. The bromine depleted solution is then pumped through the brominator again. "Dowex 1" and "Dowex 21K" are examples of resins which may be used in the ion exchange bed.

It is realized that in many instances the depleted solution leaving the ion exchange bed would enter a reservoir and then be pumped back through the brominator, but for the sake of simplicity such an arrangement is not shown in the drawing.

Because air which is entrained with the water or bromide feed soltuion tends to carry a small bubble of bromine with it as the air passes through the bromine, the porous plate 40 is provided in the discharge line 36 to restrain the liquid bromine from passing into the discharge line.

The pores in the porous sintered glass plates 12 and 40 are from 40 to 60 microns in diameter. Smaller diameter pores may be used, but the pressure drop across the porous plate tends to become excessive. If a plate having larger diameter pores is used, the bromine tends to pass downwardly through the plate 12 and into the chamber 14 unless sufficient pressure is applied to the incoming feed solution to keep the pores of the plate 12 filled with feed solution which passes upwardly through the bromine in the process of becoming brominated.

A brominator of the type described above is readily capable of producing a 25% to 30% bromine solution.

One brominator which was constructed is composed of a glass vessel having a total height of 15 inches and a diameter of 6 inches. The fritted glass plate 12 is disposed 1 inch above the bottom of the vessel. A 3 inch diameter disc 40 is disposed with its closest edge 10 inches from the bottom of the vessel. This brominator has produced 25% ot 30% bromine solutions at a rate of from 1 pound to 25 pounds of bromine per hour.

While the brominator described above is of all glass construction, other materials which are resistant to dry and wet bromine may be used in the fabrication of the apparatus. "Teflon," glass lined metal (no pin holes in the lining) and other ceramics are examples of suitable materials of construction.

While the invention has been principally illustrated and described in connection with recirculating feed material through the brominator and a ion exchange bed, the apparatus is well suited for use in feeding a bromine solution directly into a process stream, for example

What is claimed is:

1. Bromination apparatus comprising an enclosed vessel made of a material which is resistant to wet and dry bromine, said vessel having a larger bromine solution forming chamber and a smaller feed liquid entry chamber, said chambers being separated by a partition comprising a porous glass filter plate, said larger chamber having tubular outlet means communicating with the interior thereof, said outlet means being disposed remotely from said filter plate, said outlet means including a porous glass filter element which is disposed across said outlet means, means for feeding bromine into said larger chamber, means for introducing feed liquid into said feed liquid entry chamber, and means for coupling said outlet means to a utilization means to be brominated.

2. Bromination apparatus in accordance with claim 1, wherein said means for introducing feed liquid includes a pump and a tube which is coupled through a wall of said vessel.

3. Bromination apparatus in accordance with claim 1, wherein the pores in said porous filter plate and said porous filter element have a maximum diameter of 40 to 60 microns.

4. Bromination apparatus in accordance with claim 1, wherein said vessel is a hollow cylindrically shaped glass vessel and the porous glass filter plate is disposed parallel to the ends of the vessel.

5. Bromination apparatus in accordance with claim 1, wherein said means for feeding bromine includes a tubular element which extends near to said porous filter plate.

6. Bromination apparatus in accordance with claim 1, wherein said vessel has valved venting means coupled to said larger chamber.

7. Bromination apparatus in accordance with claim 1, wherein said means for feeding bromine, said means for introducing feed liquid and said outlet means are valved.

References Cited by the Examiner

UNITED STATES PATENTS

| | | | |
|---|---|---|---|
| 1,142,361 | 6/1915 | Ornstein | 210—62 |
| 1,588,991 | 6/1926 | Radoff | 210—94 |
| 1,698,537 | 1/1929 | Cushwa | 210—62 |
| 2,304,142 | 12/1942 | Rickford | 210—94 |
| 2,623,014 | 12/1952 | Kloth | 210—62 |
| 2,843,142 | 7/1958 | Gardner | 137—604 |

FOREIGN PATENTS 1,127,113    8/1956    France.

REUBEN FRIEDMAN, *Primary Examiner.*

HERBERT L. MARTIN, *Examiner.*